United States Patent [19]

Lines et al.

[11] 4,016,227

[45] Apr. 5, 1977

[54] PROCESS FOR THE ISOLATION OF POLYIMIDES IN A SOLID STATE

[75] Inventors: Gregory L. Lines, Cheshire; Alec Odinak, New Haven, both of Conn.

[73] Assignee: The Upjohn Company, Kalamazoo, Mich.

[22] Filed: Feb. 7, 1972

[21] Appl. No.: 224,311

[52] U.S. Cl. .................... 264/14; 260/63 N; 264/143; 264/180; 264/203

[51] Int. Cl.[2] .................. B29C 23/00; B29F 3/00

[58] Field of Search ............ 264/203, 13, 143, 14, 264/180; 260/65, 78 TF, 63 N

[56] References Cited

UNITED STATES PATENTS

| | | | |
|---|---|---|---|
| 2,087,019 | 7/1937 | Clement | 264/13 |
| 2,558,732 | 7/1951 | Cresswell | 264/143 |
| 3,247,165 | 4/1966 | Rodia | 264/203 X |
| 3,365,525 | 1/1968 | Schueler | 264/143 X |
| 3,705,870 | 12/1972 | Darmory | 260/78 TF |
| 3,708,458 | 1/1973 | Alberino | 260/65 |

FOREIGN PATENTS OR APPLICATIONS 1,962,588   7/1970   Germany .................. 260/65

*Primary Examiner*—Thomas P. Pavelko
*Attorney, Agent, or Firm*—Denis A. Firth; John Kekich

[57] ABSTRACT

A process is described for the isolation, in a solid state, of polyimides particularly those prepared by interaction of a polyisocyanate and a polycarboxylic anhydride in an organic solvent. A solution of the polyimide is passed into water preferably in the form of droplets or as extruded thin strands. The droplets or strands can be chopped, ground or otherwise comminuted after solidification. The process is particularly applicable to the isolation of solvent-soluble polyimides prepared by reaction of benzophenone tetracarboxylic dianhydride with a mixture of methylenebis(phenyl isocyanate) and toluene diisocyanate.

5 Claims, No Drawings

PROCESS FOR THE ISOLATION OF POLYIMIDES IN A SOLID STATE

BACKGROUND OF THE INVENTION

1. Field of the Invention

This invention relates to an improved process for the preparation of polyimides and is more particularly concerned with an improved process for the isolation of non-cellular polyimides in a solid state.

2. Description of the Prior Art

Non-cellular polymides are widely used for wire coating, lamination and related adhesive uses in environments which require high resistance to deformation by heat and to combustion. They have been prepared in a two step process by reaction of a polyamine with a polycarboxylic polyanhydride to obtain the corresponding amide-acid intermediate. The latter amide-acid is then cyclized by dehydration to form the desired polyimide. Illustrative of this method are the procedures described in U.S. Pat. Nos. 3,179,630 and 3,179,631 and by Scroog et al., J. Polymer Science, Part A, Vol. 3, pages 1373 to 1390, 1965.

More recently, a process has been devised in which a polymide is obtained directly by interaction of a polyisocyanate and a polycarboxylic polyanhydride; see, for example, U.S. Pat. No. 3,562,189. In this method the polyisocyanate and polyanhydride are brought together in the presence of an aprotic solvent such as dimethylsulfoxide, N-methylpyrrolidone and the like and heated, if desired. When the reaction is carried out on a relatively small scale, e.g. in a laboratory scale preparation, the polyimide generally separates from solution in the form of a solid or alternatively, the polyimide can be precipitated from the solution of reaction product by addition of a second solvent. However, when this reaction is carried out on a larger scale, i.e. to prepare batches of material of the order of several kilograms or higher, it is found to be extremely difficult to isolate the polyimide from the reaction product.

Presumably because the polyimide reaction product is a mixture of materials of differernt molecular weights, the reaction product tends to separate from the reaction mixture, either spontaneously or after the addition of solvent in which the polyimide is insoluble, as a viscous sticky mass. The latter is very hard to handle with conventional equipment and greatly complicates the problem of production of large quantitles of the desired polyimides.

We have now found that this problem can be solved in an elegant and economical manner by a procedure which is described hereinafter. This procedure can be applied to isolation of polyimides when prepared by any of the procedures known in the art.

SUMMARY OF THE INVENTION

This invention comprises a process for isolating a polyimide in a solid state from a solution of said polyimide in a dipolar aprotic solvent, which process comprises passing said polyimide solution into water.

DETAILED DESCRIPTION OF THE INVENTION

The process of the invention can be applied directly to the reaction product obtained in the actual synthesis of the polyimide whenever this reaction has been carried out in a dipolar aprotic solvent. Alternatively, the reaction product can be precipitated from the solution in which the reaction product is prepared and the precipitate, usually in the form of a viscous mass, can be dissolved in a dipolar aprotic solvent.

The term "dipolar aprotic solvent" is employed in its well-recognized meaning; see, for example, U.S. Pat. No. 3,562,189, supra. Illustrative of such solvents are dimethylsulfoxide, dimethylacetamide, hexamethylphosphoramide, N-methyl-2-pyyrolidone, tetramethylurea, pyridine and the like. The preferred solvent is N-methyl-2-pyrrolidone for reasons which will be discussed below.

Advantageously, the amount of polyimide present in the solution in dipolar aprotic solvent which is used as starting material in the process of the invention, is within the range of about 10 percent to about 30 percent by weight. The viscosity of the said solution is advantageously in the range of about 100 cps to about 500,000 cps at 25° C. Obviously, in the case of any given polyimide, the concentration in a given solvent is directly related to the viscosity and these two variables are, accordingly, dependent upon each other.

In carrying out the process of the invention the polyimide solution is passed into water in the form of droplets, strands or in any other form in which the exposed surface area per unit volume is as high as possible and the bulk of material not exposed to the water is as low as possible. Illustratively, the polyimide solution is formed into droplets by allowing the solution to fall under gravity through conventional drop-forming apparatus, for example, one or a plurality of open-ended tubes having a relatively small orifice. The droplets can be formed above the surface of a water bath and allowed to fall therein under gravity. Alternatively the droplets can be formed directly under water. In either case the water bath is maintained at approximately room temperature i.e. about 20° C or in some cases can be maintained with advantage at higher temperatures up to about 60° C or even higher.

In another embodiment the process of the invention is carried out by feeding the polyimide solution to the inlet port of any conventional extruding machine. The latter can be of the piston or screw type, depending upon the viscosity of feed solution, the screw extruder being used in the case of the more viscous polyimide solutions. The extruder is provided with one or a plurality of orifices in the extrusion head. Advantageously, said orifices have diameters within the range of about 0.010 to about 0.250 thousandths of an inch and preferably within the range of about 0.020 to about 0.060 thousandths of an inch.

Where the viscosity of the polyimide solution is relatively low, i.e. of the order of about 10,000 cps or less at 25° C, the process of the invention can be carried out using a highly simplified form of extruder consisting of a pipe, for example, having an internal diameter of about 2 inches, one end of which is capped with a plate having one or a plurality of holes drilled therein, said hole or holes having a diameter within the above-quoted range. The polyimide solution is pumped under a pressure of about 100 psi to the uncapped end of the pipe using standard pumping equipment to accomplish the desired extrusion of polyimide via the orifice or orifices.

Whichever means of extrusion is adopted, the strands of material so extruded are passed directly into a bath of water maintained at a temperature within the range discussed above. Alternatively, the extrusion die face can be maintained in direct contact e.g. under the surface of the water and the strands of material are thereby extruded directly underwater.

The extrusion of the polyimide solution can be carried out continuously, in which case the extruded strands are passed continuously through a water bath using suitable means to advance the strands (e.g. by pulling or winding on to a spool) through the bath. Where the extrusion is carried out in a batch type operation, the strands are deposited in the water bath and are allowed to remain therein.

Whether the solid polyimide is prepared in droplets or extruded strands in accordance with the invention the time for which the droplets or strands are maintained under water is not especially critical. Within a very short period — generally several minutes after entering the water — the material has solidified and can then be removed from the water and chopped, crushed, or comminuted in any appropriate manner. However, it is found advantageous to allow the droplets or strands to be exposed to the action of water, for example, by allowing the material to remain in the water bath and causing the water in the bath to be agitated to provide circulation of water through the droplets or strands. The prolonged exposure to water provides an opportunity for any dipolar aprotic solvent remaining in the material to be leached out by the water.

It is in this particular respect that the use of N-methyl-2-pyrrolidone is the preferred solvent employed in the process of the invention. It is found that this particular solvent is readily leached from the droplets or strands by the exposure to water.

After the solid polyimide has been recovered from the water bath and comminuted, the material so obtained is dried to remove water and any remaining dipolar aprotic solvent. The drying is accomplished conveniently by heating under vacuum. It is in this operation that a further advantage is found for the use of the preferred solvent. Thus, it is found that polyimide prepared in accordance with the process of the invention using N-methyl-2-pyrrolidone as solvent shows no tendency to darken in color when exposed to the vacuum drying procedure whereas polyimides prepared in accordance with the process of the invention using other dipolar aprotic solvents show a marked tendency to darken in color on heating under vacuum in the drying stage of the process of the invention.

As previously mentioned, the process of the invention can be applied to any crude polyimide product obtained in accordance with the processes described in the art; see, the summary of the prior art, supra. The process of the invention has particular application to the working up of polyimide reaction products obtained by reaction of a polycarboxylic polyanhydride, such as 3,3′,4,4′-benzophenonetetracarboxylic acid dianhydride, with a mixture of 4,4′-methylenebis(phenyl isocyanate) and toluene diisocyanate. Such products and their preparation are described in co-pending application Ser. No. 124,958, filed Mar. 16, 1971, now U.S. Pat. No. 3,708,458 in the name of Louis M. Alberino, William J. Farrissey, Jr., and James S. Rose. These particular co-polymides show markedly improved mold flow properties and higher glass transition temperatures compared to polyimides made from 4,4′-methylenebis(phenyl isocyanate) without significant loss in structural strength properties which are normally expected with polyimides based on toluene diisocyanate. Further, certain of these copolyimides exhibit remarkably high solubility in polar solvents which makes them especially useful in the preparation of films, coatings and the like.

The following examples describe the manner and process of making and using the invention and set forth the best mode contemplated by the inventors of carrying out the invention but are not to be construed as limiting.

EXAMPLE 1

A crude polyimide solution was prepared as follows. Nineteen pounds (0.0590 lb. moles) of benzophenone-3,3′,4,4′-tetracarboxylic dianhydride were dissolved in 100 lb. of N-methylpyrrolidone in a 20 gal. stirred reactor. The solution was heated to 80° C. A mixture of 2.98 lb. (0.0119 lb moles) of 4,4′-diisocyanato diphenyl methane and 8.30 lb. (0.0477 lb. moles) of toluene-2,4-diisocyanate was added to the reactor over a period of 6 hours. The agitation was continued at 80° C for an additional 10 hours.

The polyimide solution so obtained was pumped, without cooling, through an extruder which comprised a 2 inch i.d. steel pipe provided with a pipe cap having 37 holes each of 0.04 inch diameter drilled therein. The rate of pumping was 0.5 gal/minute. The strands so extruded were passed directly beneath the surface of a water bath containing 135 gallons of water at an initial temperature of 15° C, the orifice of the extruder being located approximately 6 inches beneath the surface of the water bath.

The strands were allowed to remain in the water bath for a period of approximately 2 hours after extrusion and thereafter was removed and chopped into segments of approximately 1 inch in length. The chopped material was then dried in vacuo overnight at 95° C initially and ultimately at 200° C. The resulting product was then milled to give a dry powder which showed good flow properties with no tendency to stick or cake.

EXAMPLE 2

A 100g portion of a polyimide solution prepared as described in Example 1 and initially at 80° C was allowed to drip slowly from a dropping funnel into a bath of 2 liters of water. The average diameter of the droplets was about 0.1 inches. The water bath was at a temperature of approximately 20° C initially and was agitated vigorously during the addition of polyimide and thereafter for a period of 1 hour. At the end of this period the solid droplets of polyimide were isolated, washed with water and dried in vacuo initially at 95° C and ultimately at 200° C. The resulting dry material was milled to a powder.

What we claim is:

1. A process for the isolation of a polyimide in a solid, non-viscous state from a reaction mixture which has been obtained by reaction of 3,3′4,4′-benzophenone tetracarboxylic dianhydride with a substantially stoichiometric amount of a mixture of toluene diisocyanate and 4,4′-methylenebis(phenyl isocyanate) in the presence of a dipolar aprotic solvent, which process comprises passing said reaction mixture through shaping means to convert said polyimide to a shape in which the exposed surface area per unit volume is as high as possible passing said shaped polyimide into water, and allowing said shaped polyimide to remain in contact with said water until solidification of said polyimide is complete.

2. A process according to claim 1 wherein said dipolar solvent is N-methylpyrrolidone and the concentration of polyimide in said solvent is from about 10 percent to about 30 percent by weight.

3. A process according to claim 2 wherein said polyimide solution is extruded as a plurality of strands.

4. A process according to claim 3 wherein the extruded strands of polyimide are chopped.

5. A process according to claim 2 wherein the polyimide solution is passed into water in the form of droplets.

* * * * *

UNITED STATES PATENT OFFICE
CERTIFICATE OF CORRECTION

Patent No. 4,016,227      Dated April 5, 1977

Inventor(s) Gregory L. Lines and Alec Odinak

It is certified that error appears in the above-identified patent and that said Letters Patent are hereby corrected as shown below:

Claim 3, line 1: The reference to "Claim 2" should read -- Claim 1 --.

Claim 5, line 1: The reference to "Claim 2" should read -- Claim 1 --.

Signed and Sealed this

Fourteenth Day of June 1977

[SEAL]

Attest:

RUTH C. MASON
*Attesting Officer*

C. MARSHALL DANN
*Commissioner of Patents and Trademarks*